(12) United States Patent
Zhang

(10) Patent No.: US 9,245,500 B1
(45) Date of Patent: Jan. 26, 2016

(54) SYSTEM AND METHOD FOR PREVENTING IMAGE CAPTURE

(71) Applicant: Yumei Zhang, San Diego, CA (US)

(72) Inventor: Yumei Zhang, San Diego, CA (US)

(*) Notice: Subject to any disclaimer, the term of this patent is extended or adjusted under 35 U.S.C. 154(b) by 0 days.

(21) Appl. No.: 14/679,976

(22) Filed: Apr. 6, 2015

Related U.S. Application Data

(60) Provisional application No. 62/077,317, filed on Nov. 10, 2014.

(51) Int. Cl.
| | |
|---|---|
| *G06T 11/20* | (2006.01) |
| *G06T 7/00* | (2006.01) |
| *G09G 5/393* | (2006.01) |
| *G09G 5/377* | (2006.01) |
| *G06F 21/10* | (2013.01) |
| *G06T 11/60* | (2006.01) |

(52) U.S. Cl.
CPC .............. *G09G 5/377* (2013.01); *G06F 21/10* (2013.01); *G06T 11/60* (2013.01); *G06F 2221/0744* (2013.01); *G06T 7/0079* (2013.01); *G06T 11/20* (2013.01); *G09G 5/393* (2013.01); *G09G 2340/125* (2013.01); *G09G 2358/00* (2013.01)

(58) Field of Classification Search
CPC ....... G09G 5/393; G06T 11/20; G06T 7/0079
See application file for complete search history.

(56) References Cited

U.S. PATENT DOCUMENTS

| | | | | |
|---|---|---|---|---|
| 2009/0117347 | A1* | 5/2009 | Bauchot et al. | 428/195.1 |
| 2009/0168158 | A1* | 7/2009 | Schwertner et al. | 359/385 |
| 2010/0182447 | A1* | 7/2010 | Namba et al. | 348/222.1 |
| 2014/0218402 | A1 | 8/2014 | Belkoura et al. | |
| 2014/0218403 | A1 | 8/2014 | Belkoura et al. | |

FOREIGN PATENT DOCUMENTS

CN           103246831 A       8/2013

* cited by examiner

*Primary Examiner* — Matthew D Salvucci
(74) *Attorney, Agent, or Firm* — Bing K. Yen

(57) ABSTRACT

The present invention is directed to a non-transitory machine readable storage medium containing program instructions for displaying digital content while preventing image capture, the non-transitory machine readable storage medium configured to generating a mask to superimpose upon a display object with the mask including one or more transparent portions and one or more opaque portions that blocks the display object therebeneath from viewing; and moving the one or more transparent portions of the mask incrementally to expose various portions of the display object in sequence. The display object may be image, text, video, or any combination thereof. The one or more transparent portions of the mask may have a linear shape extending along a first direction and may move in a second direction substantially perpendicular to the first direction. Alternatively, the one or more transparent portions of the mask may have a sector-shaped opening that rotates to expose the display object.

19 Claims, 21 Drawing Sheets

SYSTEM AND METHOD FOR PREVENTING IMAGE CAPTURE

CROSS-REFERENCE TO RELATED APPLICATIONS

The present application claims the benefit of the provisional application bearing Ser. No. 62/077,317 filed Nov. 10, 2014, entitled "System and method to protect object display from photographic capture using moving masks."

BACKGROUND

The present invention relates generally to a system and method for preventing image or photographic capture of an object or image by placing a moving mask in front thereof.

An owner of an object for viewing, such as an art item, a holographic display, or an image on a digital device, may desire to prevent unauthorized image or photographic capture of the object or image by viewers that use camera, screen capture on digital devices, and other capture means.

Information relevant to attempts to address this problem can be found in China Patent Application No. CN 201310186530, U.S. Patent Application Publication Nos. 20140218402 and 20140218403. However, each one of these references suffers from one or more of the following disadvantages: special hardware requirement, inefficient algorithm that may be slow or burden the computational capacity, and limiting only to screen capture prevention on digital devices.

For example, China Patent Application No. CN 201310186530 describes a method for preventing screen capture on digital devices. The disclosed method divides a screen into two categories that correspond to non-protected area and protected area with the protected area placed in a special protected processor display memory that does not allow screen capture. This method disadvantageously requires digital devices, such as cell phones and computers, to equip with the special protected display memory, which would undesirably increase the cost of digital devices.

U.S. Patent Application Publication Nos. 20140218402 and 20140218402 describe a screen-capture prevention method in which an image for viewing on digital devices is divided into a plurality of subimages, which are then displayed in rapid succession to recreate the original image. This method and algorithm thereof may be inefficient and may burden the computational power of digital devices, especially hand held devices, such as cell phone, that have limited computational capacity, as shall be discussed in more detail below.

For the foregoing reasons, there is a need for a system and method for preventing image capture that does not require special hardware and that can be implemented in hand held devices which have limited computational capacity.

SUMMARY

The present invention is directed to a non-transitory machine readable storage medium containing program instructions for displaying digital content while preventing image capture. The non-transitory machine readable storage medium is configured to generating a mask to superimpose upon a display object with the mask including one or more transparent portions and one or more opaque portions that blocks the display object therebeneath from viewing; and moving the one or more transparent portions of the mask incrementally to expose various portions of the display object in sequence. The display object may be image, text, video, or any combination thereof. The one or more transparent portions of the mask may have a linear shape extending along a first direction and may move in a second direction substantially perpendicular to the first direction. Alternatively, the one or more transparent portions of the mask may have a sector-shaped opening that rotates to expose the display object.

According to another aspect of the present invention, a computer implemented method for displaying digital content while preventing image capture comprising the steps of generating a mask to superimpose upon a display object on a digital device with the mask including one or more transparent portions that expose the display object; displaying a composite image of the mask superimposed upon the display object on the digital device; and moving the mask incrementally to expose various portions of the display object in sequence. The rate of movement of the mask may vary with task load and hardware capability of the digital device, such as but not limited to computer, tablet, or phone.

BRIEF DESCRIPTION OF THE DRAWINGS

These and other features, aspects, and advantages of the present invention will become better understood with regard to the following description, appended claims, and accompanying drawings where:

For purposes of clarity and brevity, like elements and components will bear the same designations and numbering throughout the Figures, which are not necessarily drawn to scale.

DETAILED DESCRIPTION

In the Summary above and in the Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

An aspect of the present invention is directed to a system for preventing image or photographic capture. The system comprises at least a mask, which includes one or more transparent portions and one or more opaque portions for partially blocking a display object or image from viewing, and a means for moving the mask to sequentially expose various portions of the display object or image. The system would prevent photographic or image capturing because only a partial view of the display object can be seen through the mask at a given time. The display object may be a physical object, such as a sculpture or painting, or a virtual object, such as a holographic object or an image for viewing on digital devices. Moreover, the display object may be a single object or an aggregate of objects.

Figure 1:
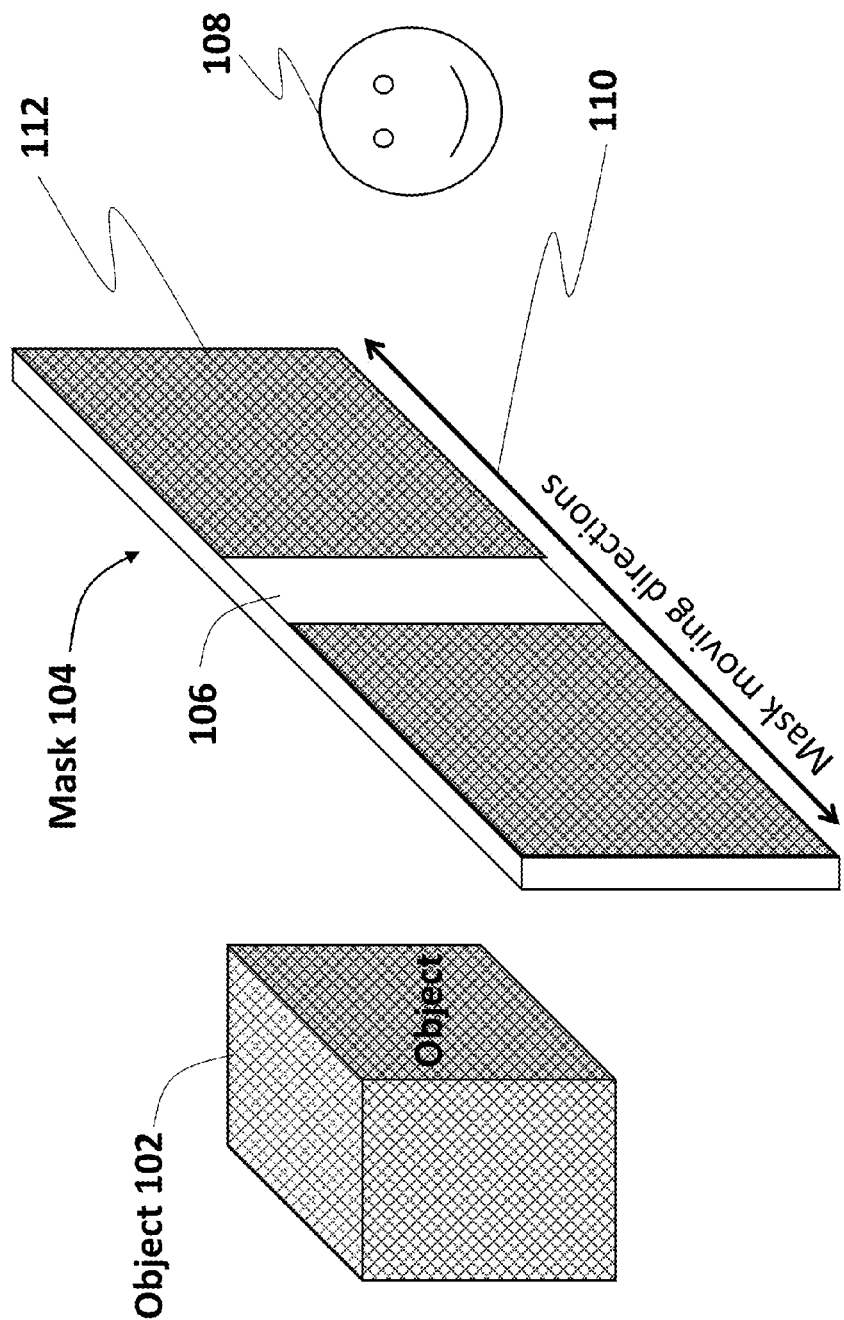
FIG. 1 depicts a scheme for preventing image or photographic capture using a linear moving mask.

An embodiment of the present invention as applied to a system for preventing image or photographic capture is illustrated in FIG. 1. Referring now to FIG. 1, the system includes at least a mask 104 disposed between an object or an aggregates of objects 102 for viewing and one or more viewers 108; and a means for moving the mask 104 to expose various portions of the object 102 in succession, which may render a complete image of the object 102 in a short time period. The mask 104 may have one or more opaque regions 112 and at least a linear opening or transparent region 106 through which a viewer or viewers 108 may have a partial view of the object 102. The mask 104 may then move along a direction 110 that is substantially perpendicular (or at least has a perpendicular motion component) to the direction of linear opening and the line of sight between the object 102 and the viewers 108. The mask 104 may move at a sufficient speed to partially or fully expose the object 102 to the viewers 108 in quick succession. To minimize the appearance of unwanted visual obstruction by the mask 104 and to improve viewing comfort, the mask moving speed may be adjusted to partially or fully expose the objects 102 at a rate that is greater than 5 times per second (5 Hz). The linear movement direction 110 may be periodic back and forth, or periodic left-to-right-to-left as illustrated in FIG. 1. Alternatively, the mask 104 may move in just one direction, such as left or right direction only. In this case, the mask 104 may need to be sufficiently long along the moving direction, and the opening or transparent region 106 may need to be placed on the mask 104 at several locations along the moving direction in short separation to facilitate the rapid exposure of the object 102 for viewing. The opaque regions 112 for masking the object 102 may have one or more suitable colors, such as black, red, green, blue, white, and any combinations thereof. While only one mask is shown in FIG. 1, the embodiment may also use additional masks having similar attributes as the one discussed above.

Depending on whether the object 102 is physical or virtual, the nature of the mask 102 and the means for moving the mask 102 may vary. For example, the mask 104 for physical objects, such as sculpture and painting, may be made of plastic, glass, or any suitable material that may have at least an opening or a transparent region and one or more opaque regions formed therein. The linear movement for such a physical mask may be provided by a linear actuator or motor coupled thereto. Alternatively, the mask 104 for physical objects and the movement thereof may be simulated by hologram, which is generated by multiple lasers. Still alternatively, the mask 104 for physical objects may be made of a transparent electronic display screen, such as organic light-emitting diode (OLED), coupled to a computing device for generating the mask pattern and the movement thereof on the transparent electronic display screen. The mask 104 for holographic display may also be made of physical objects such as plastic and glass, or virtual objects such as hologram, or transparent electronic display screen as described above.

For other virtual display objects, such as images for displaying on digital devices, the mask 104 and the movement thereof may be simulated by a computer program residing in the host device, where the image is stored or transmitted from, or the client device, where the image is viewed. The computer program may generate images of the moving mask and superimpose the images of the moving mask on top of images of the display object to form composite images of the display object and mask.

The present invention only permits a camera or a screen shot to capture the areas of the display objects that are exposed through the opening during the short time period when the camera shutter or screen shot is activated. When the opening area is sufficiently small, the areas exposed by the mask at any given moment may not provide enough detail for viewers to fully comprehend the object being displayed, thereby protecting the object against photographic capture or screen shot on digital devices, while allowing the viewers to comprehend the object being displayed over a longer time period as the mask incrementally exposes the object.

Figure 2:
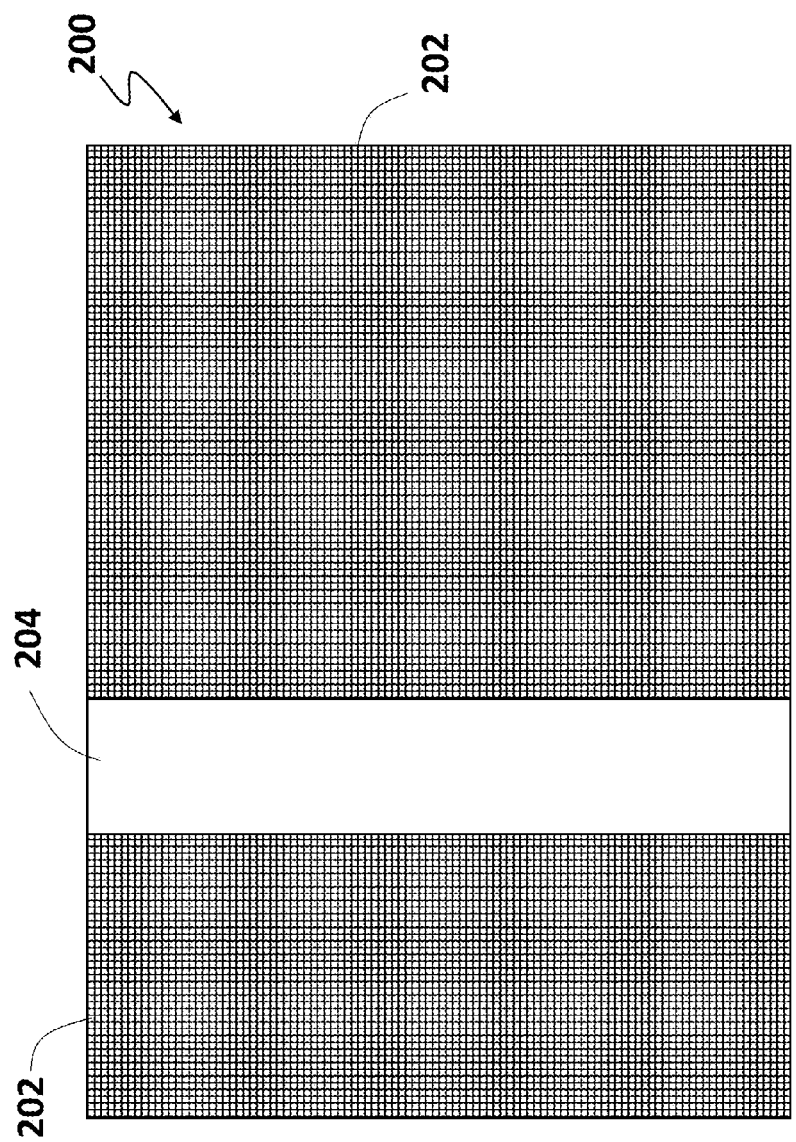
FIG. 2 shows a mask having a linear opening for preventing image or photographic capture.

FIG. 2 illustrates an embodiment of the present invention as applied to a mask that may be used with the system of FIG. 1. The mask 200 is shown to have two blocking areas 202 and a linear opening 204. The opening 204 may be a physical opening or may be an optically transparent region to allow viewers to see through. The blocking areas 202 of the mask 200 are opaque and do not allow viewers to look through. Depending on the primary colors of the display object or image, the blocking areas 202 may have a suitable color, such as but not limited to red, green, blue, black, or any combination thereof. In some cases, the mask 200 with the blocking areas 202 in black may minimize any visual interference caused by the moving mask 200, thereby enhancing viewing experience of viewers. The opening 204 shown in FIG. 2 has a straight linear shape extending along a direction for ease of implementation. In practice, however, curved linear shapes may also be used for better aesthetic presentation. It should be noted that while FIG. 2 shows the mask 200 having two blocking areas 202 separated by the linear opening 204, the linear opening 204 may be positioned at one of the edges of the mask 200, resulting in only one blocking area. Moreover, the area of the opening 204 may or may not be larger than the total area of the blocking areas 202, depending on the moving speed of the mask 200.

Figure 3:
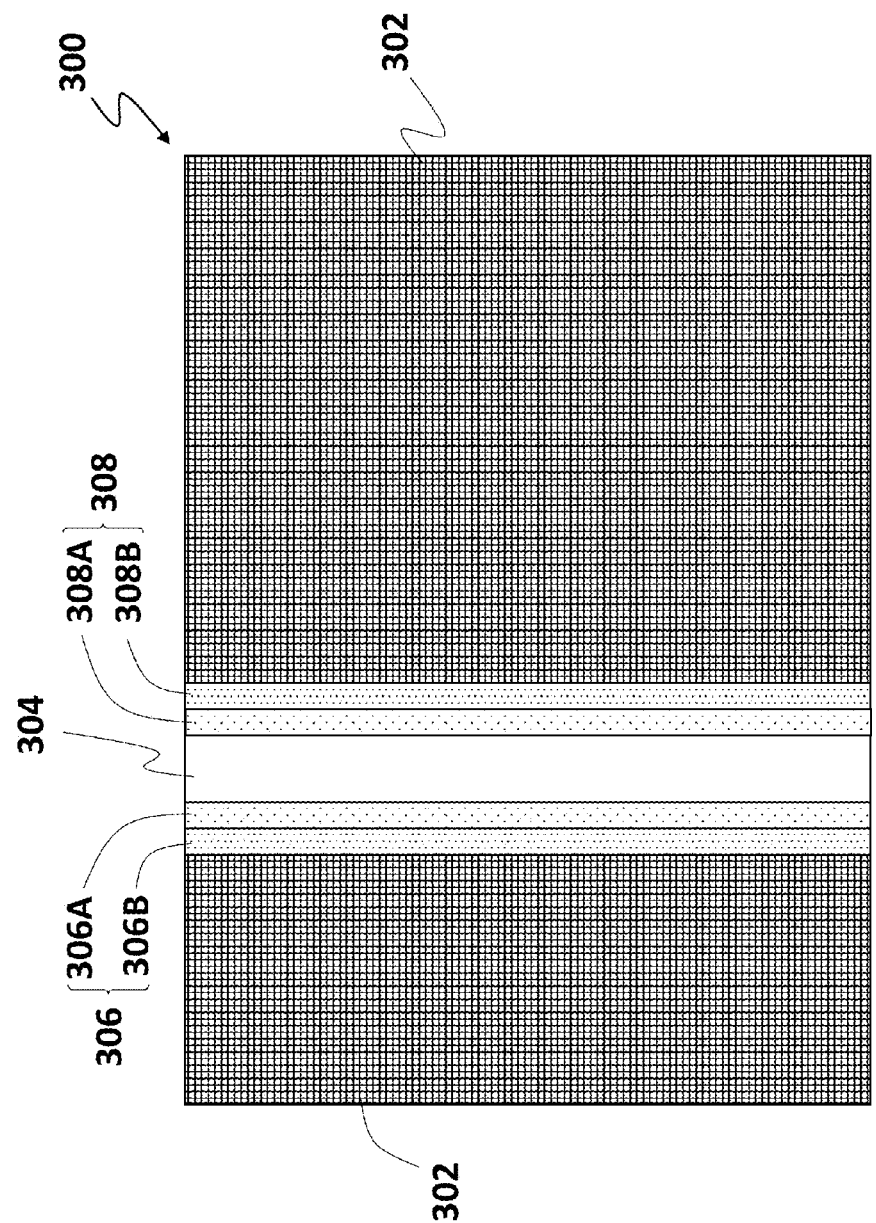
FIG. 3 shows a mask having a linear optical opening with graded opaqueness over opening edges for preventing image or photographic capture.

FIG. 3 shows another mask 300 that is a variant of the mask 200. The edges 306 and 308 of the mask opening 304 are semi-transparent or semi-opaque, which may improve viewing experience by minimizing the abruptness of transition between the blocking areas 302 and the opening 304. Each of the edges 306 and 308 may have one or more regions with different degrees of transparency. For example, a region 306A formed adjacent to the mask opening 304 may have a 70% transparency while another region 306B formed adjacent to one of the blocking areas 302 may have a 30% transparency. With the edges 306 and 308 of the mask opening 304 being semi-transparent, the exposure of the object or image behind the mask 300 may appear to be smoother as the mask 300 moves.

Figure 4:
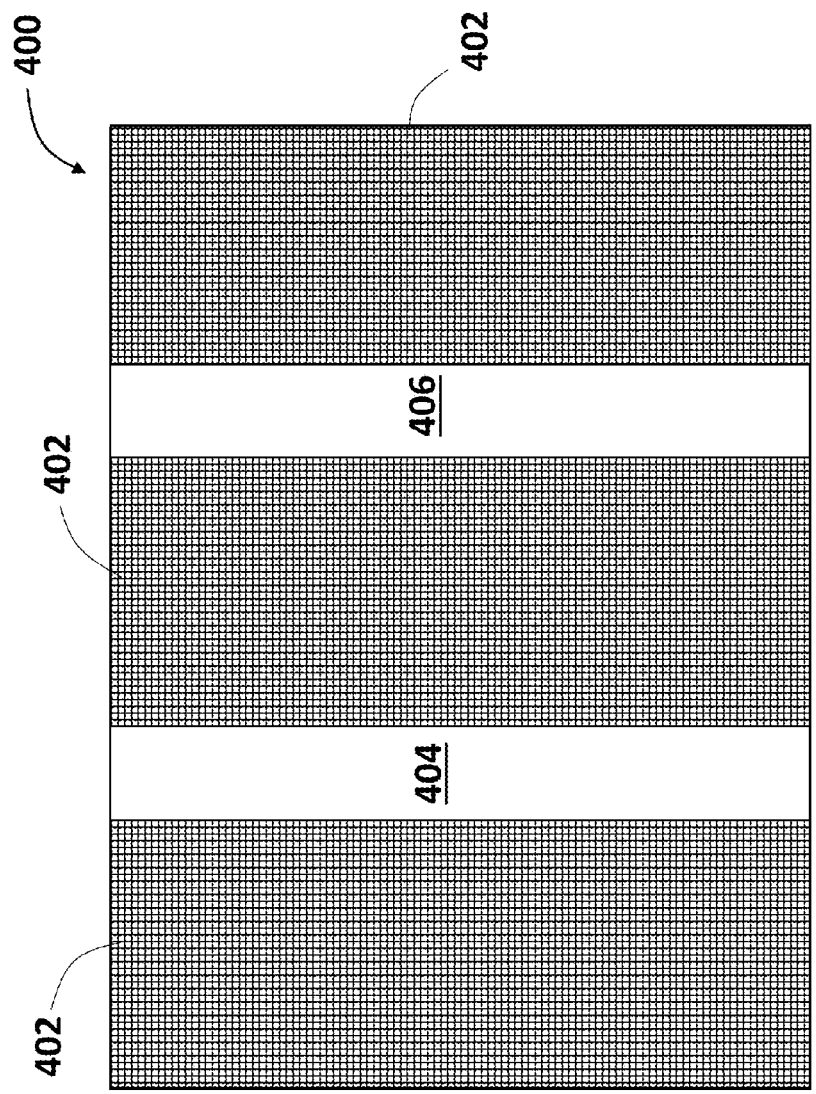
FIG. 4 shows a mask having multiple linear openings (either physical or optical) for preventing image or photographic capture.

FIG. 4 shows another variant 400 of the mask 200 having multiple openings or transparent areas 404 and 406. Accordingly, the mask 400 may have multiple blocking areas 402. Viewers may see through the openings 404 and 406, but not through the blocking areas 402, which may have a suitable color, such as but not limited to black, red, green, blue, yellow, or any combination thereof. Moreover, at least one edge of the openings 404 and 406 may include one or more semi-transparent regions (not shown) as illustrated in FIG. 3 and described above. The multiple openings 404 and 406 may provide smoother exposure of the display object or image. In practice, the number of openings may be optimized based on the trade-offs between viewing comfort and degree of protection against photographic or image capture. As the number of openings increases, the display object or image becomes more smoothly exposed to viewers while making it easier to extrapolate the blocked areas from a photographic capture or image shot.

Figure 5:
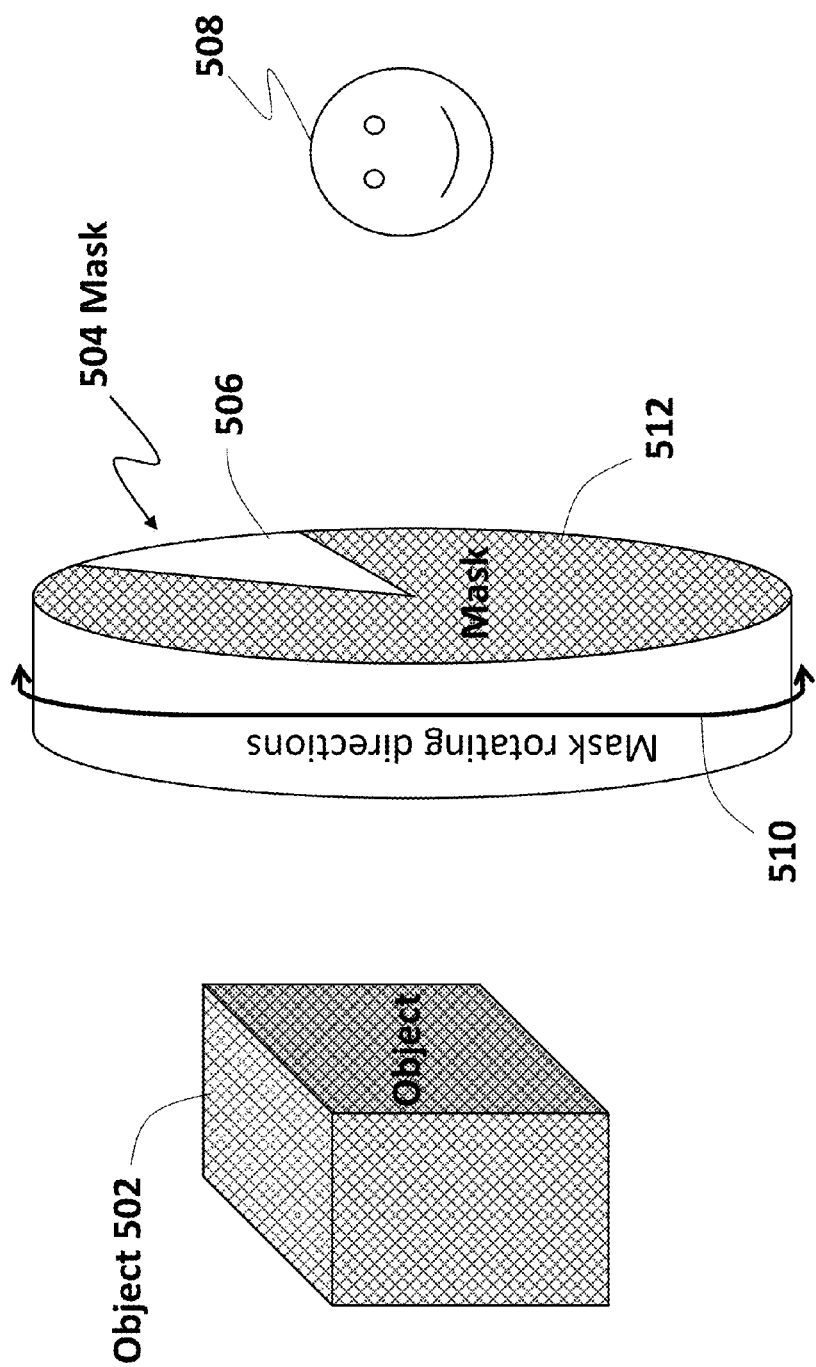
FIG. 5 depicts another scheme for preventing image or photographic capture using a rotary moving mask.

Another embodiment of the present invention as applied to a system for preventing image or photographic capture is illustrated in FIG. 5. The system includes at least a mask 504 disposed between an object or an aggregates of objects 502 for viewing and one or more viewers 508; and a means for rotating the mask 504 to expose various portions of the object 502 in succession. The mask 504 may have one or more opaque regions 512 and at least a sector-shaped opening or transparent region 506 through which the viewers 508 may have a partial view of the object 502. The mask 505 may then rotate with an axis of rotation substantially parallel to the line of sight between the viewers 508 and the object 502. The mask 504 may rotate at a sufficient speed to partially or fully expose the object 502 to the viewers 508 in quick succession. To minimize the appearance of unwanted visual obstruction by the mask 504 and to improve viewing comfort, the mask rotating speed may be adjusted to partially or fully expose the object 502 at a rate that is greater than 5 times per second. The mask 504 may rotate in a clock wise or counter-clock wise direction 510 with respect to the viewers 508. Alternatively, the mask 504 may rotate back and forth between the clock wise and counter-clock wise direction. The opaque region 512 for masking the object 502 may have one or more suitable colors, such as black, red, green, blue, white, and any combinations thereof. While only one mask is shown in FIG. 5, the embodiment may also use additional masks having similar attributes as the one discussed above.

Like the embodiment of FIG. 1, the nature of the mask 504 and the means for moving the mask 504 for the embodiment of FIG. 5 may vary depending on whether the object 502 is physical or virtual. For virtual object such as image for displaying on digital devices, the mask 504 and the movement thereof may be simulated by a computer program residing in the host device, where the image is stored or transmitted from, or the client device, where the image is viewed. The computer program may generate images of the rotating mask and superimpose the images of the rotating mask on top of the images of the display object to form composite images of the display object and mask.

Figure 6:
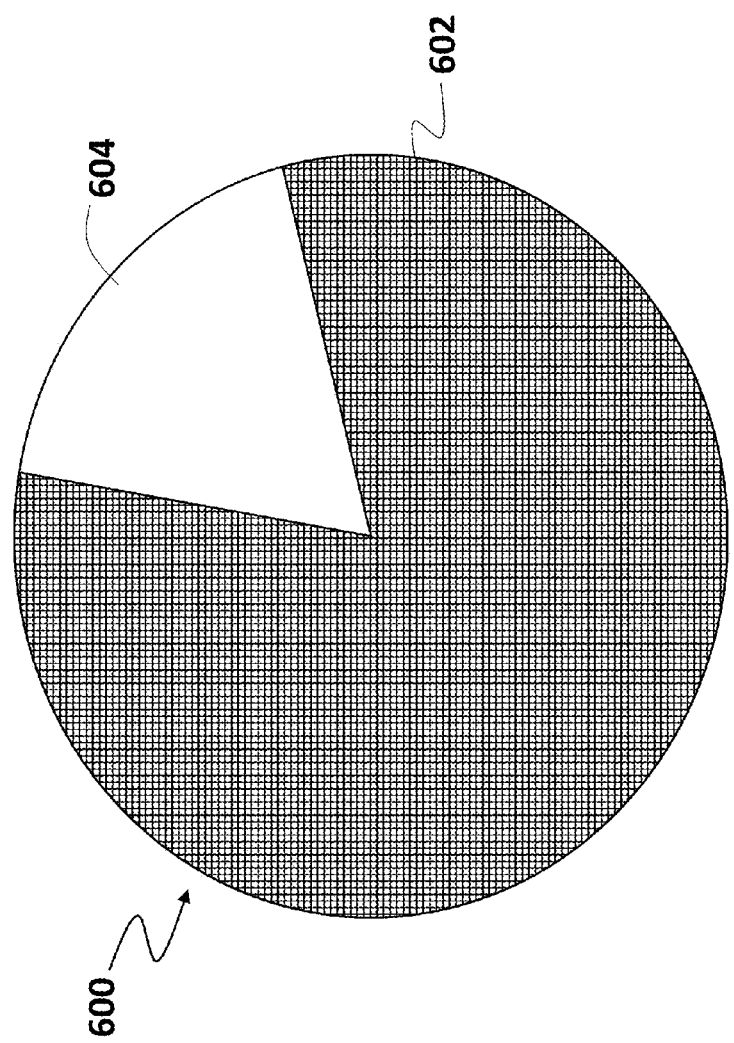
FIG. 6 shows a mask having a sector-shaped opening for preventing image or photographic capture.

FIG. 6 illustrates another embodiment of the present invention as applied to a mask that may be used with the system of FIG. 5. The mask 600 is shown to have a sector-shaped opening 604. The opening 604 may be a physical opening or may be an optically transparent region to allow viewers to look through. The blocking area 602 of the mask is opaque and does not allow viewers to see through. Depending on the primary colors of the display object or image, the blocking area 602 may have a suitable color, such as but not limited to red, green, blue, yellow, black, or any combination thereof. In some cases, the mask 600 with the blocking area 602 in black may minimize any visual interference caused by the moving mask, thereby enhancing viewing experience for viewers. The sector-shaped opening 604 shown in FIG. 6 has straight edges for ease of implementation. In practice, however, a sector-shaped opening having curved edges may also be used for better aesthetic presentation. It should be noted that the area of the sector-shaped opening 604 may or may not be larger than the area of the blocking area 602, depending on the rotating speed of the mask 600.

Figure 7:
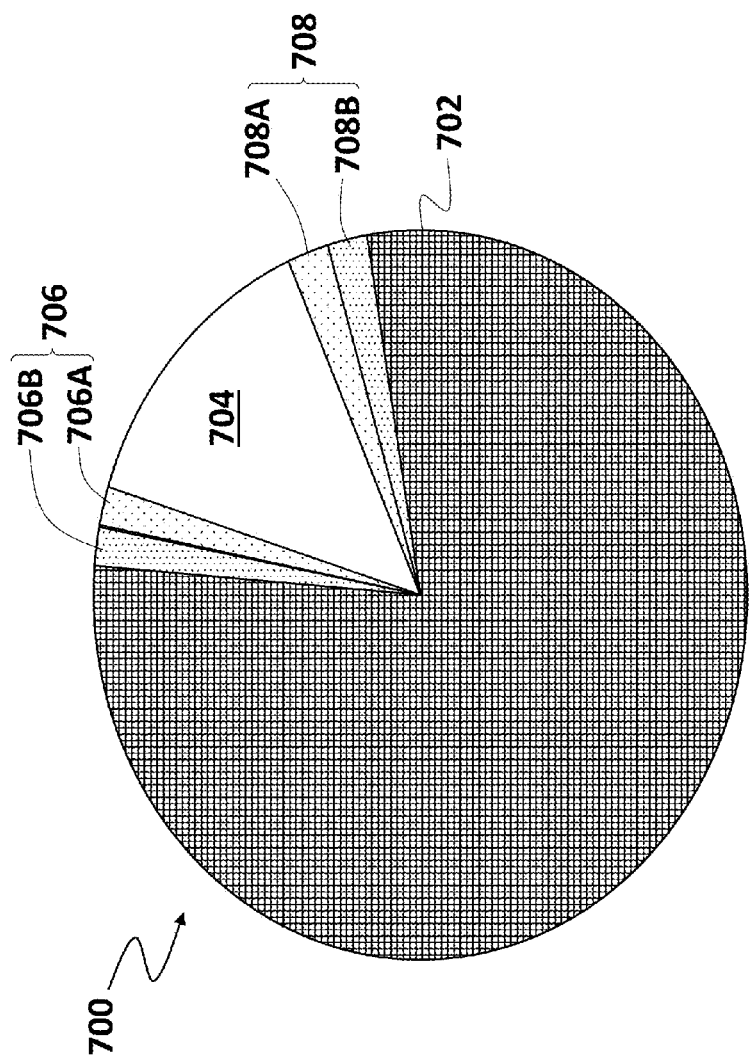
FIG. 7 shows a mask having a sector-shaped optical opening with graded opaqueness over opening edges for preventing image or photographic capture.

FIG. 7 shows another mask 700 that is a variant of the mask 600. The edges 706 and 708 of the mask opening 704 are semi-transparent or semi-opaque, which may improve viewing experience by minimizing the abruptness of transition between the blocking area 702 and the opening 704. Each of the edges 706 and 708 may have one or more regions with different degrees of transparency. For example, a region 706A formed adjacent to the mask opening 704 may have a 70% transparency while another region 706B formed adjacent to the blocking area 702 may have a 30% transparency. With the edges 706 and 708 of the mask opening 704 being semi-transparent, the exposure of the object or image behind the mask 700 may appear to be smoother as the mask 700 rotates.

Figure 8:
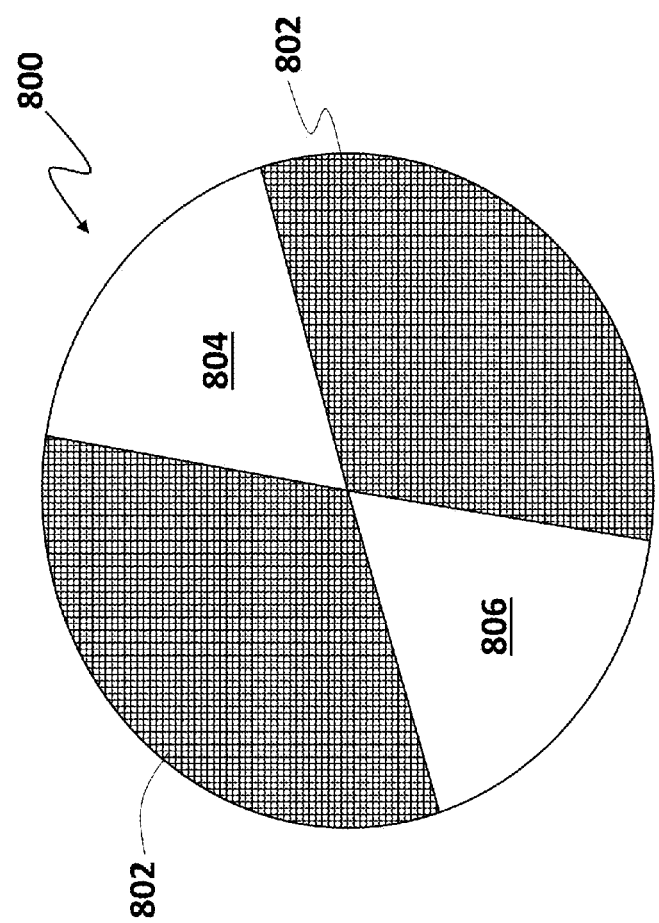
FIG. 8 shows a mask having multiple sector-shaped openings for preventing image or photographic capture.

FIG. 8 shows another variant 800 of the mask 600 having multiple openings or transparent areas 804 and 806. Accordingly, the mask 800 may have multiple blocking areas 802. Viewers may see through the openings 804 and 806, but not through the blocking areas 802, which may have a suitable color, such as but not limited to black, red, green, blue, yellow, or any combination thereof. Moreover, at least one edge of the openings 804 and 806 may include one or more semi-transparent regions (not shown) as illustrated in FIG. 7 and described above. The multiple openings 804 and 806 may provide smoother exposure of the display object or image. In practice, the number of openings may be optimized based on the trade-offs between viewing comfort and degree of protection against photographic or image capture. As the number of openings increases, the display object or image becomes more smoothly exposed to viewers while making it easier to extrapolate the blocked areas from a photographic capture or image shot.

Figure 9:
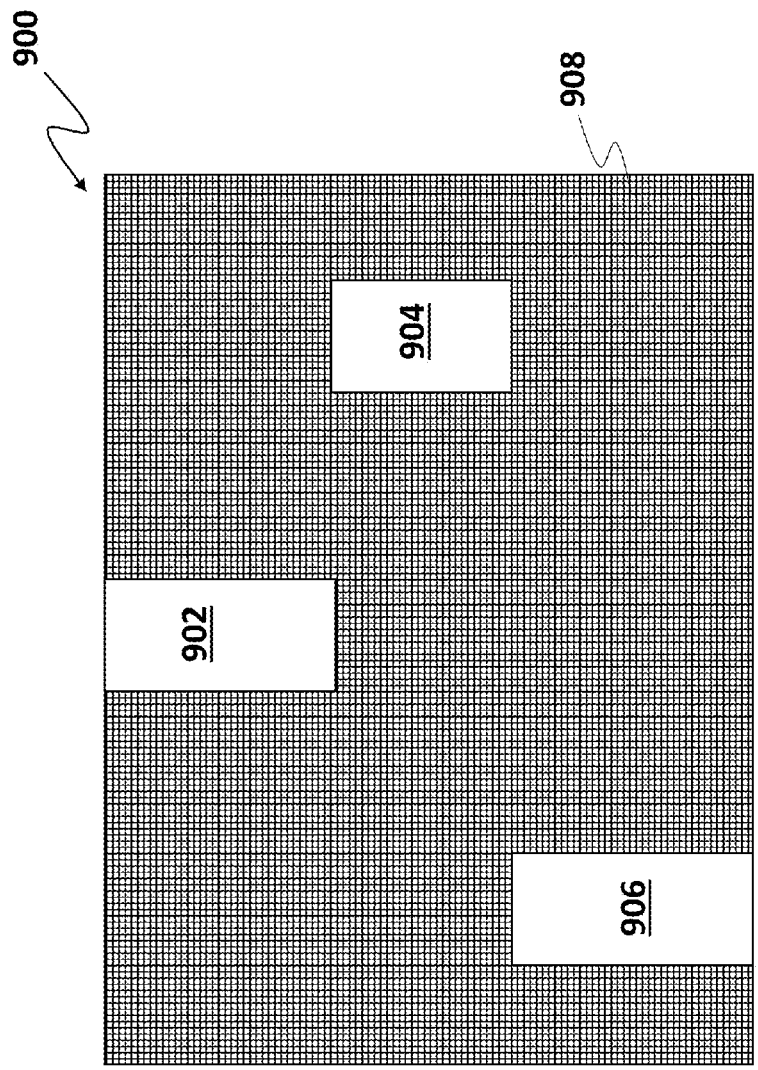
FIG. 9 shows a mask having multiple segmented linear openings for preventing image or photographic capture with linear mask movement.

The mask openings 204 and 604 of the masks 200 and 600, respectively, may be divided into multiple segments with each segment displaced some distance with respect to other segments in the direction of the mask movement. For example, FIG. 9 shows a mask 900, which is a variant of the mask 200 in FIG. 2, having multiple segmented openings 902, 904, and 906. The segmented openings 902-906 may be shifted from the original linear positions shown in FIG. 2, and may spread out on the mask 900 along the direction perpendicular to the linear extension direction of the opening 204 in FIG. 2. By spreading out segmented openings 902-906, the photographic or image capture of the display object becomes more difficult to extrapolate or comprehend along the direction perpendicular to the mask movement or the linear direction of the opening 204 in FIG. 2. Moreover, one or more of the multiple liner openings 404 and 406 of the mask 400 shown in FIG. 4 may have segmented openings (not shown) with one or more of the segmented openings possibly having semi-transparent edges (not shown) that are perpendicular to the mask movement as described above and illustrated in FIG. 3.

Figure 10:
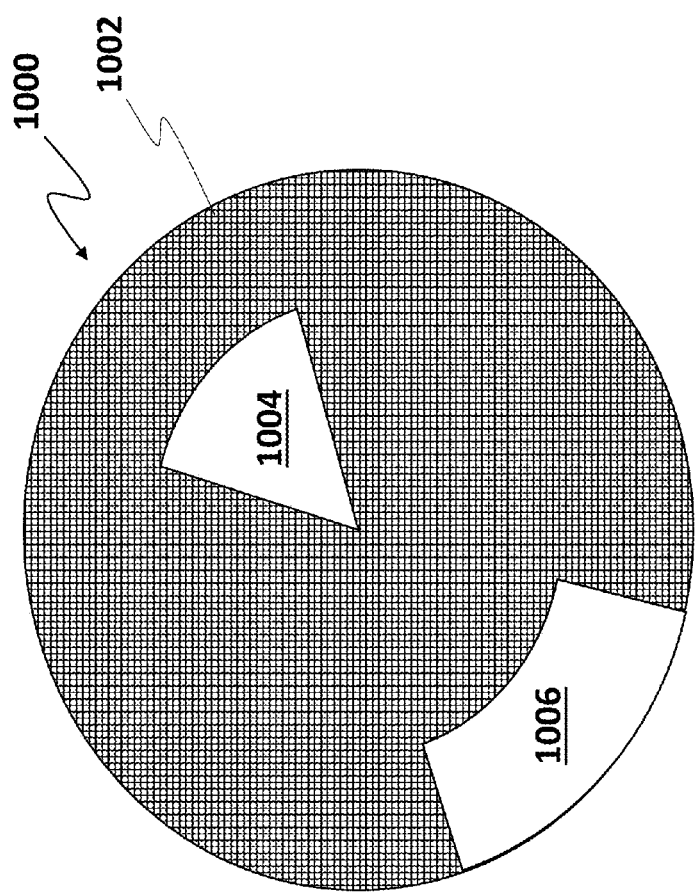
FIG. 10 shows a mask having multiple segmented sector-shaped openings for preventing image or photographic capture with rotary mask movement.

Similarly, FIG. 10 shows a mask 1000, which is a variant of the mask 600 with the sector-shaped opening 604, having multiple segmented openings 1004 and 1006. The segmented openings 1004 and 1006 may be shifted from their original positions shown in FIG. 6, and may spread out on the mask 1000 along the rotation direction of the opening 604 in FIG. 6. By spreading out segmented openings 1004 and 1006, the photographic or image capture of the display object becomes more difficult to extrapolate or comprehend along the direction perpendicular to the mask rotation direction or the radial direction of the sector-shaped opening 604 in FIG. 6. Moreover, one or more of the multiple sector-shaped openings 804 and 806 of the mask 800 shown in FIG. 8 may have segmented openings (not shown) with one or more of the segmented openings possibly having semi-transparent edges (not shown) that are perpendicular to the mask movement as described above and illustrated in FIG. 7.

It is to be understood that the present invention may be practiced with one or more masks superimposed on each other. Each mask may have at least one linear opening, such as those shown in FIGS. 2-4, 9, or at least one sector-shaped opening, such as those shown in FIGS. 6-8, 10, or both. Each mask may have a linear movement, or a rotational movement, or both.

Figure 11:
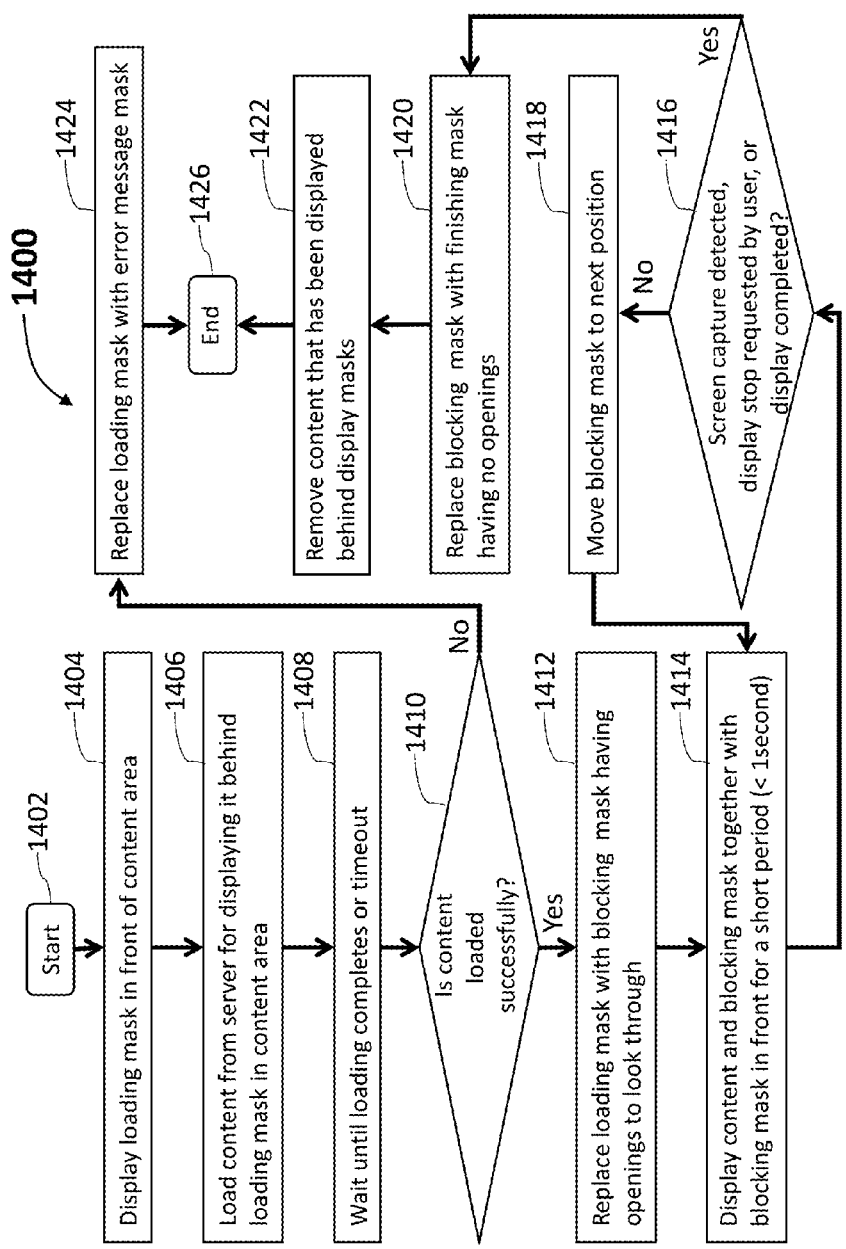
FIG. 11 is a flow chart describing a method embodiment for preventing image or photographic capture on a computer or a mobile phone using mask moving at a pre-defined speed.
Figure 12:
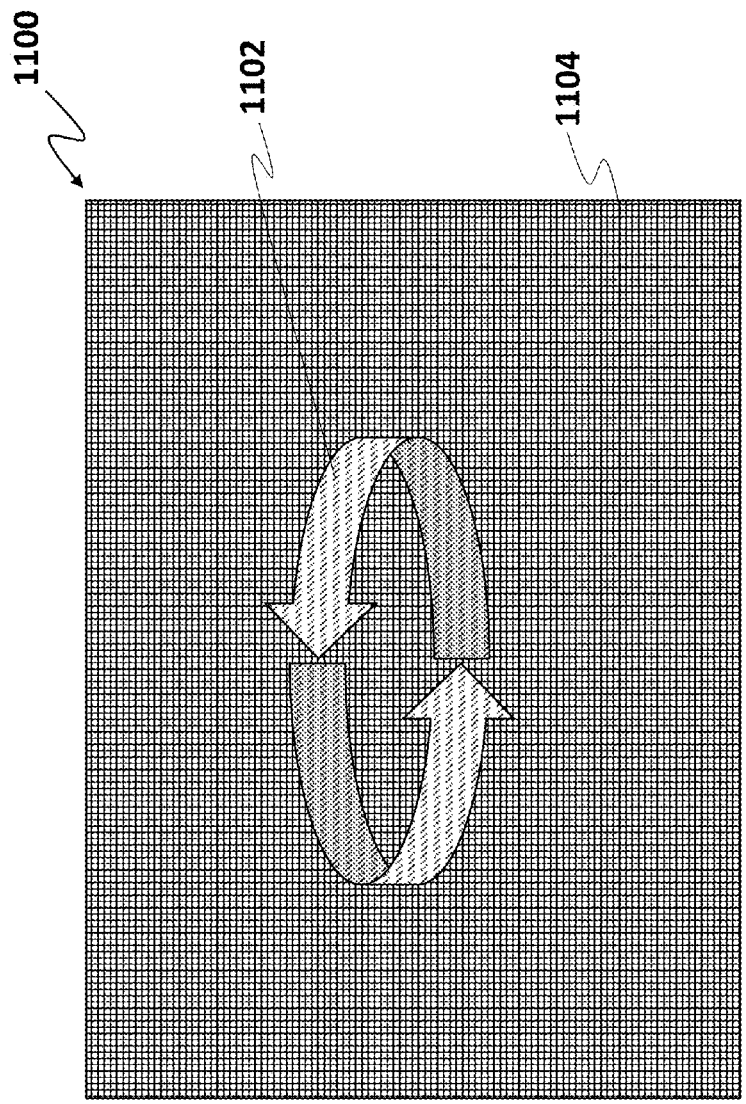
FIG. 12 is an exemplary mask used to block display area while display content is being loaded.

An embodiment of the present invention as applied to a method for preventing image capture on a digital device is illustrated in FIG. 11. The flow chart 1400 in FIG. 11 shows that the process begins with the step of displaying a loading mask in the content area 1404, which may be a partial or whole display screen of the digital device for displaying the image. Unlike the blocking masks of FIGS. 2-4 and 6-10, the loading mask may not have any opening and is designed to screen or block the content area while the display content, such as but not limited to image, text, video, or any combination thereof, is being transferred to or loaded onto the digital device. Therefore, the loading mask may be stationary. FIG. 12 shows an exemplary loading mask 1100 having only an opaque region 1104 without any opening for viewing. The loading mask 1100 may have an icon 1102 indicating that the display content is being loaded.

Figure 13:
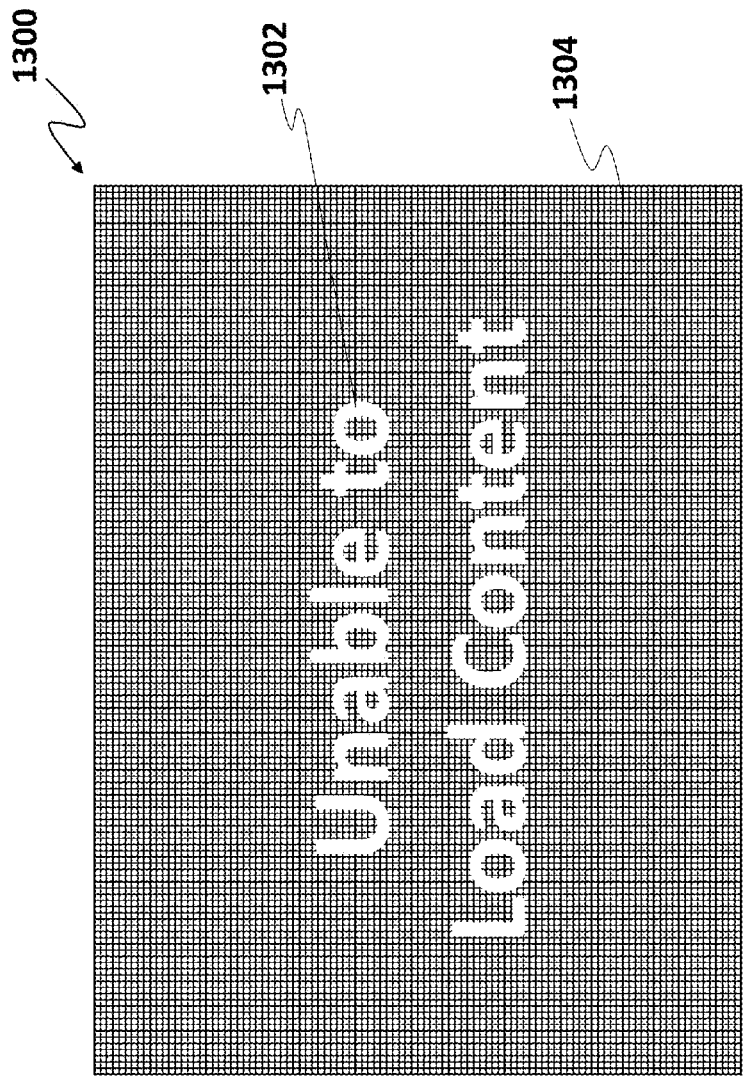
FIG. 13 is an exemplary mask used to block display area when content cannot be loaded.

After the step of displaying the loading mask 1404, the process proceeds by sending a request to a host device or server and then loading the requested image or display content behind or beneath the loading mask 1406. The process continues by waiting for the step of content loading onto the digital device to complete 1408 and then ascertaining whether the display content has been successfully loaded 1410. If the display content cannot be properly loaded for any reason, the loading mask may be replaced with an error message mask in the content area 1424 and the display process may be terminated 1426. FIG. 13 shows an exemplary error message mask 1300 having only an opaque region 1304 without any opening for viewing. The error message mask 1300 may contain a message 1302 informing the viewers that the display content cannot be properly loaded.

Figure 14:
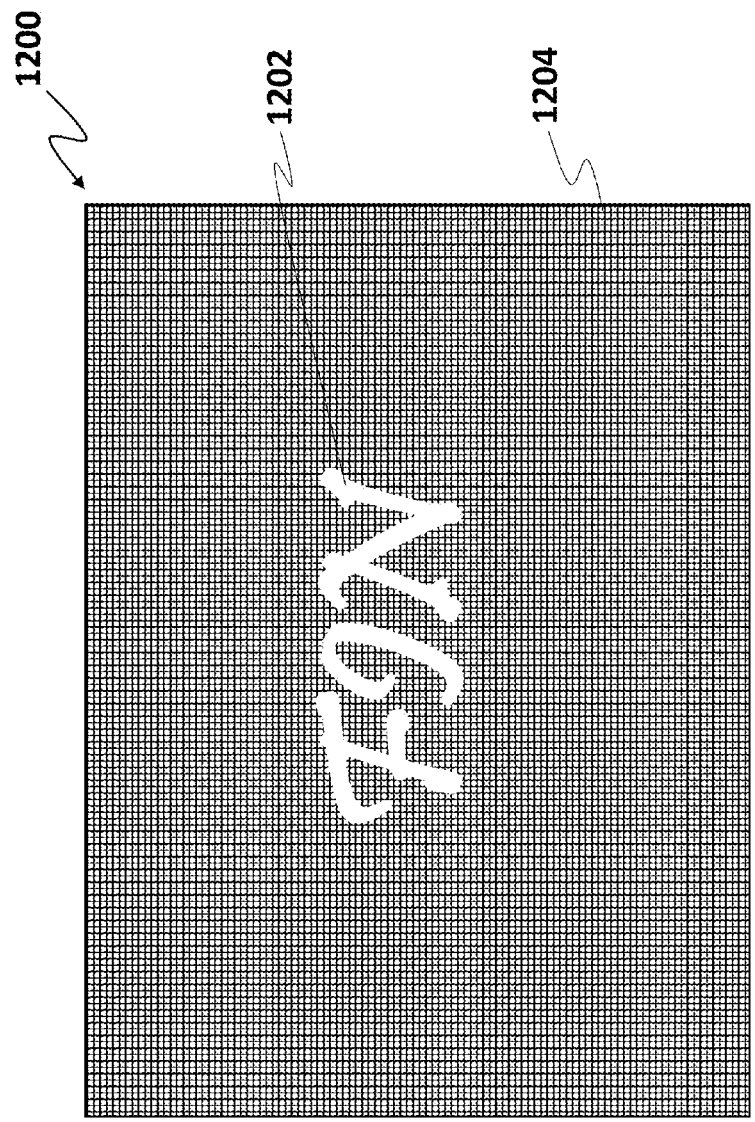
FIG. 14 is an exemplary mask used to block display area after content is finished being displayed.

If the decision step 1410 finds the display content is properly loaded, then the loading mask is replaced with a view blocking mask, such as but not limited to one of the above described masks 200, 300, 400, 600, 700, 800, 900, and 1000, with the display content beneath or behind the view blocking mask 1412. The display content may then be shown with the view blocking mask superimposed thereon for a short period of time 1414, which may be less than 50 microseconds. The process then proceeds by determining whether screen capture has been deployed on the digital device 1416. If screen capture or attempt to deploy screen capture is detected in the step 1416, then the view blocking mask is replaced with a finish mask without any opening 1420 and the display content is removed from the digital device 1422, effectively terminating the viewing process 1426. FIG. 14 shows an exemplary finish mask 1200 having only an opaque region 1204 without any opening for viewing. The finish mask 1200 may have an icon or words 1202 indicating that the showing of the display content is finished.

If screen capture or attempt to deploy screen capture is not detected in the step 1416, then the view blocking mask may move to the next position 1418 and the display content is again shown with the view blocking mask superimposed thereon 1414. The step of moving the view blocking mask to the next position 1418 may be carried out by a computer program that simulates the view blocking mask and the movement thereof. The steps 1416, 1418, and 1414 may repeat until screen capture is detected, or the viewer terminates the process, or the display content has been completely shown, after which the view blocking mask is replaced with the finish mask 1420 and the display content is then removed from behind the view blocking mask 1422 and may be removed from the digital device.

While it is desirable to expose the entire display content by sweeping the opening of the view blocking mask across the entire display content, in some cases, only a portion, say over half of the display content, needs to be exposed for the viewer to comprehend the display content.

It is desirable to move the view blocking mask as fast as possible to minimize the appearance of unwanted visual obstruction by the mask and to ensure the display content is smoothly displayed. For example, for a digital device with 60 Hz refreshing rate for its display (i.e. 60 frames per second), the view blocking mask ideally should incrementally move with every frame. However, the CPU and GPU processing power or hardware capability of a computing device used to execute the program for simulating the view blocking mask and the movement thereof may be somewhat limited, especially for a hand held device such as mobile phone. For computing devices with limited hardware capabilities, there is a threshold on how fast or frequent the view blocking mask may be smoothly moved on the devices. If the frame rate or number movements per unit time of the view blocking mask exceeds the threshold of hardware capability, then not all movements of the view blocking mask can be properly generated and superimposed upon the display content, which may cause the composite image of the display content and the mask superimposed thereon to be intermittently marked by blotches corresponding to the opening of the mask at the skipped positions or frames.

The CPU and GPU processing power of a computing device used to execute the program for simulating the view blocking mask and the movement thereof may also vary in real-time with respect to the total task load or the number of processes that are simultaneously running on the computing device. The percentage of CPU and GPU power allocated to the program for simulating the mask and the movement thereof may decrease to accommodate other processes simultaneously running on the computing device. Therefore, it is desirable to optimize the speed of the view blocking mask movement in real-time by moving the mask as fast as possible while avoiding the skipping (or dropping) of the mask movement in the composite images.

Figure 15A:
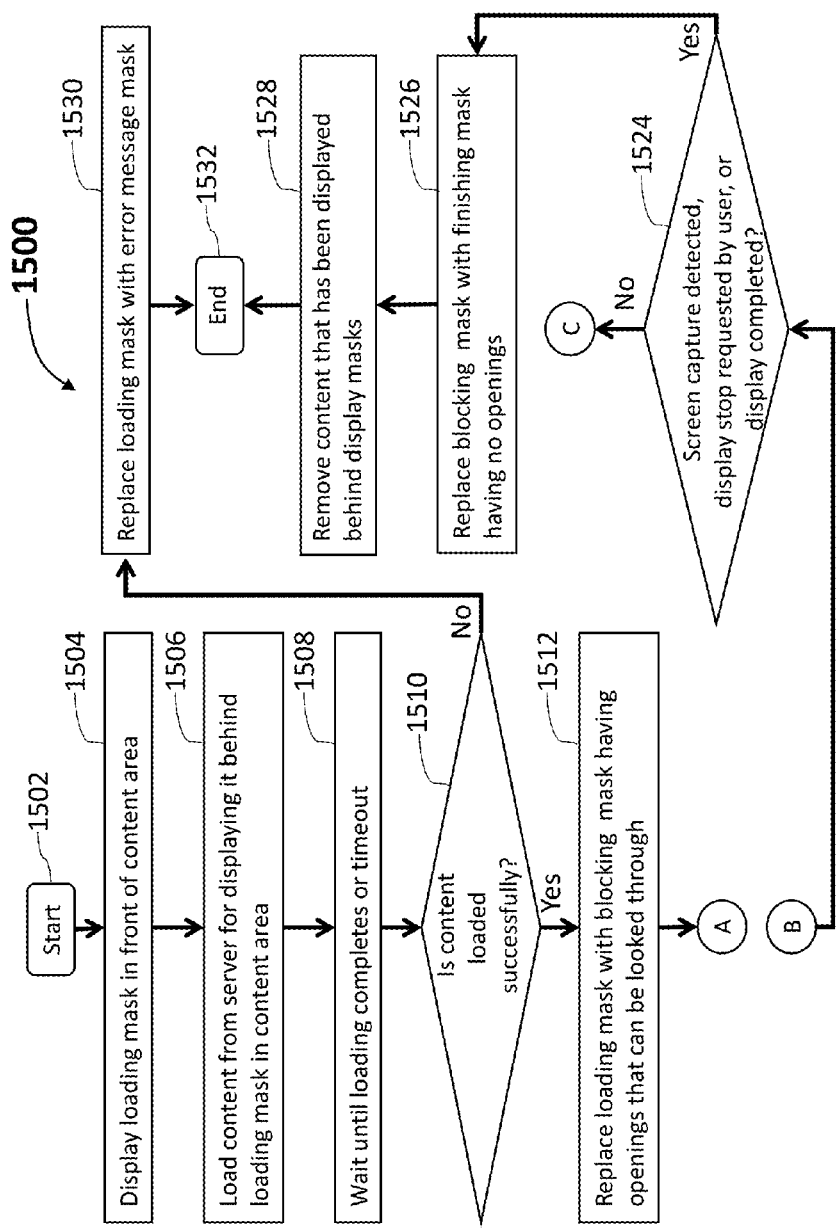
FIGS. 15A and 15B describe a second method embodiment for preventing image or photographic capture on a computer or a mobile phone using mask moving at an adaptive speed that is optimized for the capability of the computer or mobile phone.
Figure 15B:
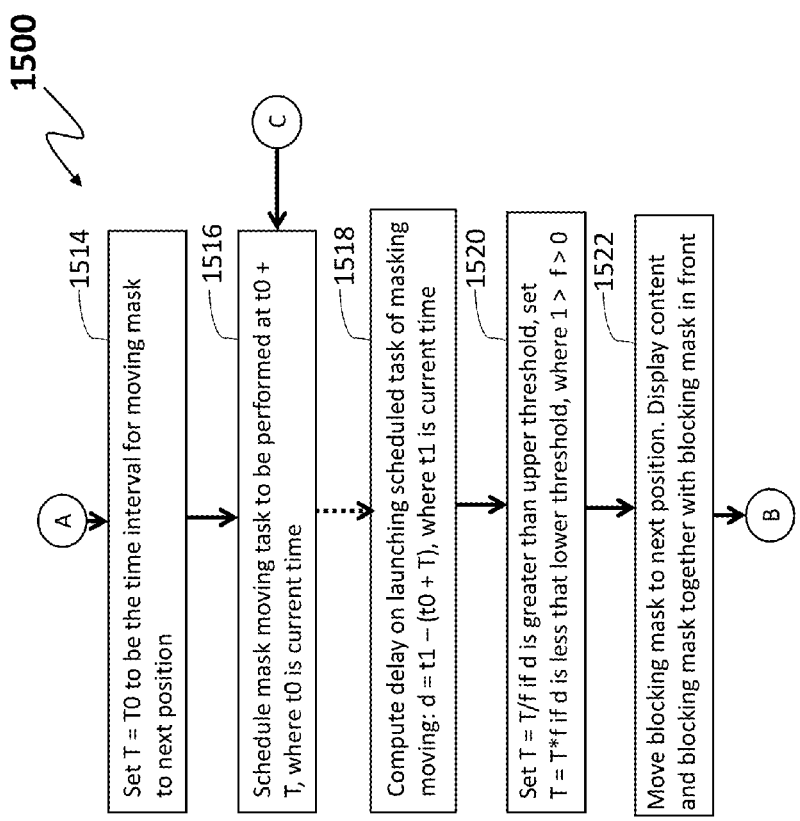

Another embodiment of the present invention as applied to a method for preventing image capture on a digital device is illustrated in FIGS. 15A and 15B. A flow chart 1500 illustrated in FIGS. 15A and 15B describes a process using adaptive techniques to optimize the speed or frequency of the view blocking mask movement with respect to the total task load and the hardware capability of the computing device.

The process begins with the step of displaying a loading mask in the content area 1504, which may be a partial or whole display screen of the digital device for displaying the image. Unlike the blocking masks of FIGS. 2-4 and 6-10, the loading mask may not have any opening and is designed to screen or block the content area while the display content, such as but not limited to image, text, video, or any combination thereof, is being transferred to or loaded onto the digital device. Therefore, the loading mask may be stationary. FIG. 12 shows an exemplary loading mask 1100 having only an opaque region 1104 without any opening for viewing. The loading mask 1100 may have an icon 1102 indicating that the display content is being loaded.

After the step of displaying the loading mask 1504, the process proceeds by sending a request to a host device or server and then loading the requested image or display content behind or beneath the loading mask 1506. The process continues by waiting for the step of content loading onto the digital device to complete 1508 and then ascertaining whether the display content has been successfully loaded 1510. If the display content cannot be properly loaded for any reason, the loading mask may be replaced with an error message mask in the content area 1530 and the display process may be terminated 1532. FIG. 13 shows an exemplary error message mask 1300 having only an opaque region 1304 without any opening for viewing. The error message mask 1300 may contain a message 1302 informing the viewers that the display content cannot be properly loaded.

If the decision step 1510 finds the display content is properly loaded, then the loading mask is replaced with a view blocking mask, such as but not limited to one of the above described masks 200, 300, 400, 600, 700, 800, 900, and 1000, with the display content beneath or behind the view blocking mask 1512. After the step of loading the view blocking mask 1512, an initial predefined value T0, which may be about 50 microseconds, is selected to be the time interval T in between two consecutive positions of the view blocking mask 1514. Accordingly, the view blocking mask is then scheduled to move to the next position at time t0+T 1516, where t0 is the current time when the mask movement is initially scheduled. Once the task for moving the view blocking mask has been executed or launched by the program, the delay between the actual and expected task launching time, if any, may be calculated by $d=t1-(t0+T)$ 1518, where d is the delay time and t1 is the actual task launching time. Depending on whether there is a delay time, a new time interval T can be set in the subsequent step 1520 to adapt the time interval T to the hardware capability and the real-time task load. If the launching delay time, d, is greater than an upper threshold, then the movement time interval T is lengthened to be T/f, where f is a pre-selected coefficient that is greater than 0 and less than 1. If the launching delay time, d, is zero or smaller than a lower threshold, then the movement time interval T may remain the same or may be shortened to be T*f, where f is a pre-selected coefficient that is greater than 0 and less than 1. After the step of setting the time interval T 1520, the view blocking mask is simulated by the program to move to the next position with the display content beneath or behind the view blocking mask 1522. The composite image of the view blocking mask in front of the display content is shown on the display screen of the digital device.

The process continues by determining whether screen capture has been deployed on the digital device 1524. If screen capture or attempt to deploy screen capture is detected in the decision step 1524, then the view blocking mask is replaced with a finish mask without any opening 1526 and the display content is removed from the digital device 1528, effectively terminating the viewing process 1532. FIG. 14 shows an exemplary finish mask 1200 having only an opaque region 1204 without any opening for viewing. The finish mask 1200 may have an icon or words 1202 indicating that the showing of the display content is finished.

If screen capture or attempt to deploy screen capture is not detected in the decision step 1524, then the view blocking mask is scheduled again to move to the next position at time t0+T 1516, where t0 is the current time when the mask movement is scheduled. The steps 1516 to 1524 are repeated until screen capture is detected, or the viewer terminates the viewing process, or the display content has been completely shown, after which the view blocking mask is replaced with the finish mask 1526 and the display content is then removed from behind the view blocking mask 1528 and may be removed from the digital device.

Figure 16A:
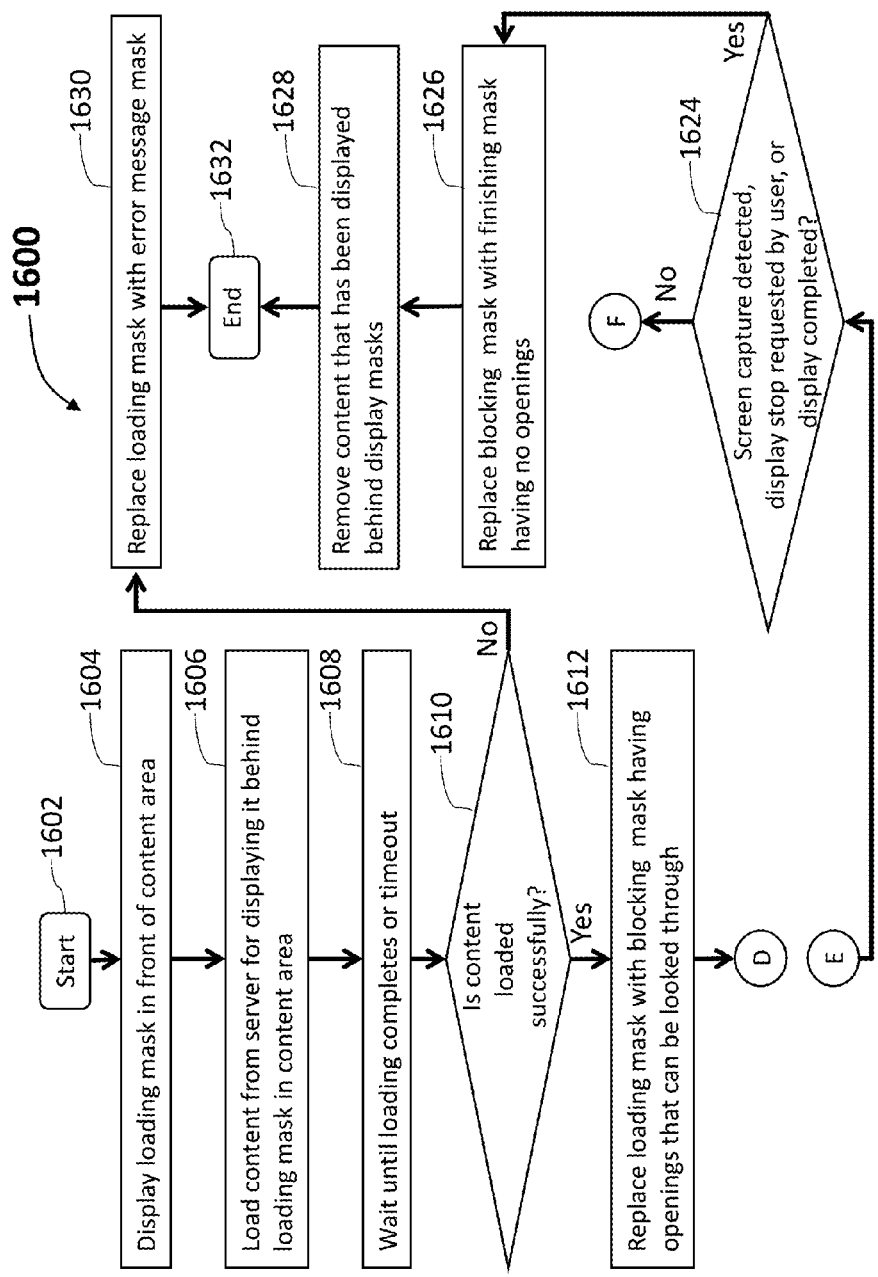
FIGS. 16A and 16B describe a third method embodiment for preventing image or photographic capture on a computer or a mobile phone by superimposing a video of a moving mask on top of the content to be displayed.
Figure 16B:
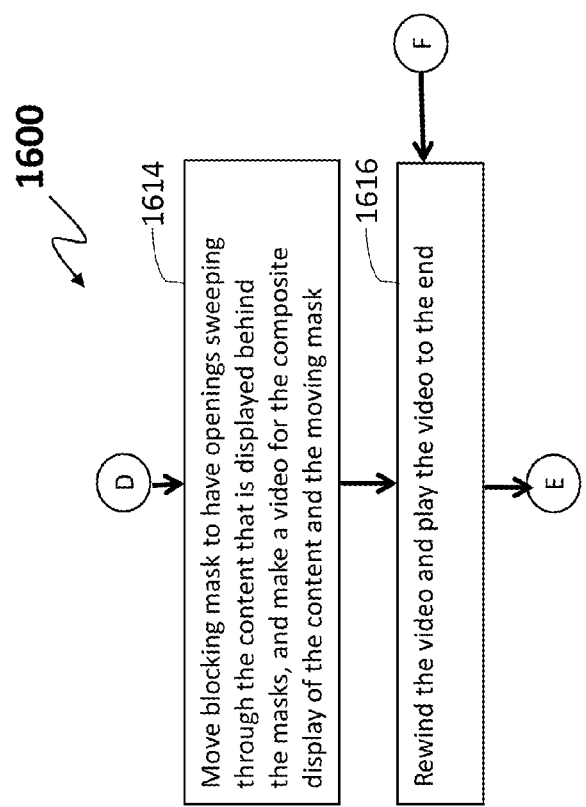

Still another embodiment of the present invention as applied to a method for preventing image capture on a digital device is illustrated in FIGS. 16A and 16B. A flow chart 1600 illustrated in FIGS. 16A and 16B describes a viewing process by repeatedly displaying a video or a series of composite images of the display content and the view blocking mask in successive positions. The process begins with the step of displaying a loading mask in the content area 1604, which may be a partial or whole display screen of the digital device for displaying the image. Unlike the blocking masks of FIGS. 2-4 and 6-10, the loading mask may not have any opening and is designed to screen or block the content area while the display content, such as but not limited to image, text, video, or any combination thereof, is being transferred to or loaded onto the digital device. Therefore, the loading mask may be stationary.

After the step of displaying the loading mask 1604, the process proceeds by sending a request to a host device or server and then loading the requested image or display content behind or beneath the loading mask 1606. The process continues by waiting for the step of content loading onto the digital device to complete 1608 and then ascertaining whether the display content has been successfully loaded 1610. If the display content cannot be properly loaded for any reason, the loading mask may be replaced with an error message mask in the content area 1630 and the display process may be terminated 1632.

If the decision step 1610 finds the display content is properly loaded, then the loading mask is replaced with a view blocking mask, such as but not limited to one of the above described masks 200, 300, 400, 600, 700, 800, 900, and 1000, with the display content beneath or behind the view blocking mask 1612. The process proceeds by moving the view blocking mask in front of the display content in the content area while making a video or a series of composite images in which the moving mask in successive positions is superimposed upon the display content 1614. The moving mask may partially or completely expose the display content at a rate of at least 5 times per second. The video may be long enough for the moving mask to completely expose the display content at least once. After the step of generating the video 1614, the video is shown in the content area from the beginning to the end 1616.

The process continues by determining whether screen capture has been deployed on the digital device 1624. If screen capture or attempt to deploy screen capture is detected in the decision step 1624, then the view blocking mask is replaced with a finish mask without any opening 1626 and the display content is removed from the digital device 1628, effectively terminating the viewing process 1632.

If screen capture or attempt to deploy screen capture is not detected in the decision step 1624, then the entire video is again shown in the content area from the beginning 1616. The steps 1616 and 1624 are repeated until screen capture is detected, or the viewer terminates the viewing process, or the display content has been completely shown, after which the view blocking mask is replaced with the finish mask 1626 and the display content is then removed from behind the view blocking mask 1628 and may be removed from the digital device.

Figure 17A:
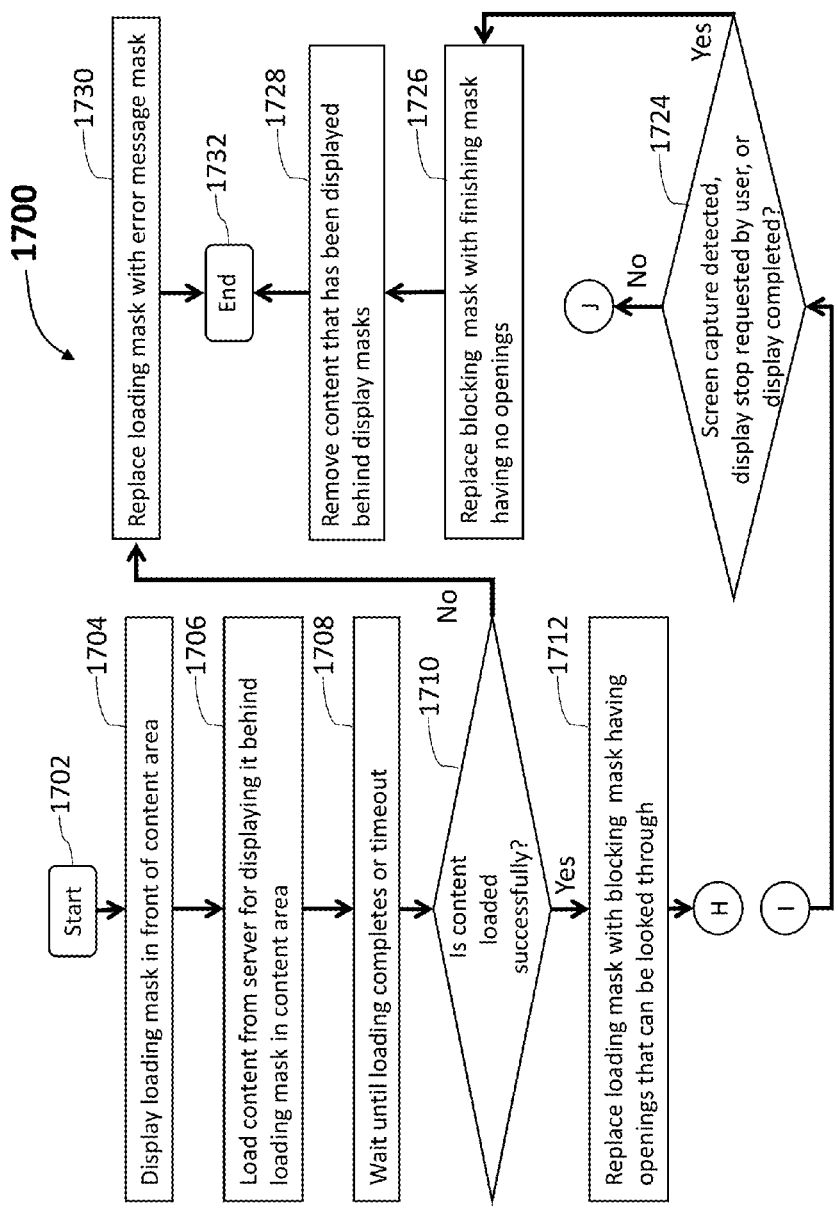
FIGS. 17A and 17B describe a fourth method embodiment for preventing image or photographic capture on a computer or a mobile phone by superimposing animated GIF images of a moving mask on top of the content to be displayed.
Figure 17B:
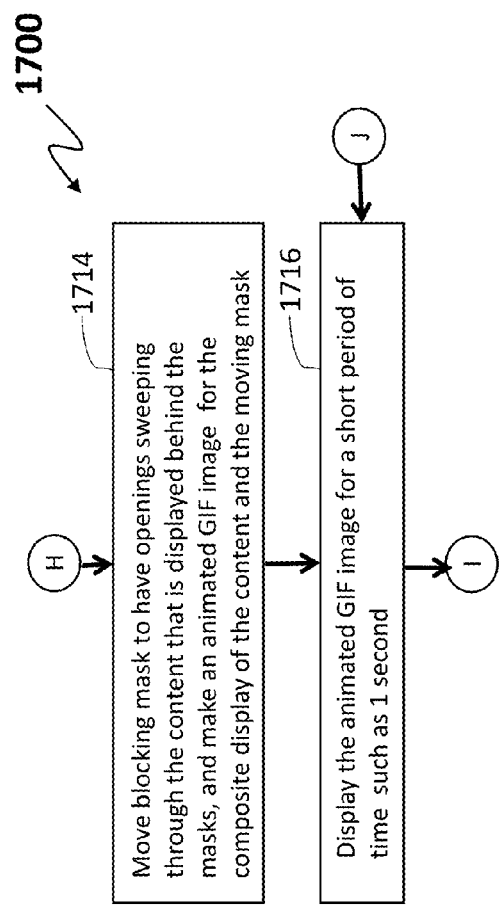

Yet another embodiment of the present invention as applied to a method for preventing image capture on a digital device is illustrated in FIGS. 17A and 17B. A flow chart 1700 illustrated in FIGS. 17A and 17B describes another viewing process by repeatedly displaying a video or a series of composite images of the display content and the view blocking mask in successive positions. The process begins with the step of displaying a loading mask in the content area 1704, which may be a partial or whole display screen of the digital device for displaying the image. Unlike the blocking masks of FIGS. 2-4 and 6-10, the loading mask may not have any opening and is designed to screen or block the content area while the display content, such as but not limited to image, text, video, or any combination thereof, is being transferred to or loaded onto the digital device. Therefore, the loading mask may be stationary.

After the step of displaying the loading mask 1704, the process proceeds by sending a request to a host device or server and then loading the requested image or display content behind or beneath the loading mask 1706. The process continues by waiting for the step of content loading onto the digital device to complete 1708 and then ascertaining whether the display content has been successfully loaded 1710. If the display content cannot be properly loaded for any reason, the loading mask may be replaced with an error message mask in the content area 1730 and the display process may be terminated 1732.

If the decision step 1710 finds the display content is properly loaded, then the loading mask is replaced with a view blocking mask, such as but not limited to one of the above described masks 200, 300, 400, 600, 700, 800, 900, and 1000, with the display content beneath or behind the view blocking mask 1712. The process proceeds by moving the view blocking mask in front of the display content in the content area while making an animated GIF image in which the moving mask in successive positions is superimposed upon the display content 1714. The moving mask may partially or completely expose the display content at a rate of at least 5 times per second. The animated GIF image may show the moving mask completely exposing the display content at least once. After the step of making the animated GIF image 1714, the GIF image is shown in the content area for a short period of time 1716, which may be about 1 second.

The process continues by determining whether screen capture has been deployed on the digital device 1724. If screen capture or attempt to deploy screen capture is detected in the decision step 1724, then the view blocking mask is replaced with a finish mask without any opening 1726 and the display content is removed from the digital device 1728, effectively terminating the viewing process 1732.

If screen capture or attempt to deploy screen capture is not detected in the decision step 1724, then the GIF image is again shown in the content area 1716. The steps 1716 and 1724 are repeated until screen capture is detected, or the viewer terminates the viewing process, or the display content has been completely shown, after which the view blocking mask is replaced with the finish mask 1726 and the display content is then removed from behind the view blocking mask 1728 and may be removed from the digital device.

It should be noted that in the method embodiments 1400, 1500, 1600, and 1700 the steps of simulating the view blocking mask moving in front of the display content and forming/displaying the composite image of the mask and display content are carried out by one or more programs residing on the client device where the display content is viewed. However, in the method embodiments 1600 and 1700, the step of making a video 1614 or an animated GIF image 1714 may alternatively be carried out by one or more programs residing on the host device or server instead of the client device. In such a case, the host device or server may send a video or an animated GIF of the mask superimposed upon the display content to the client device after receiving a request for the display content.

If the display content is text, it is preferred to have the text displayed in light color, such as white, against a dark background color, such as black. The light colored text against the dark back ground may appear less flickery when dark colored blocking masks are used.

Figure 18:
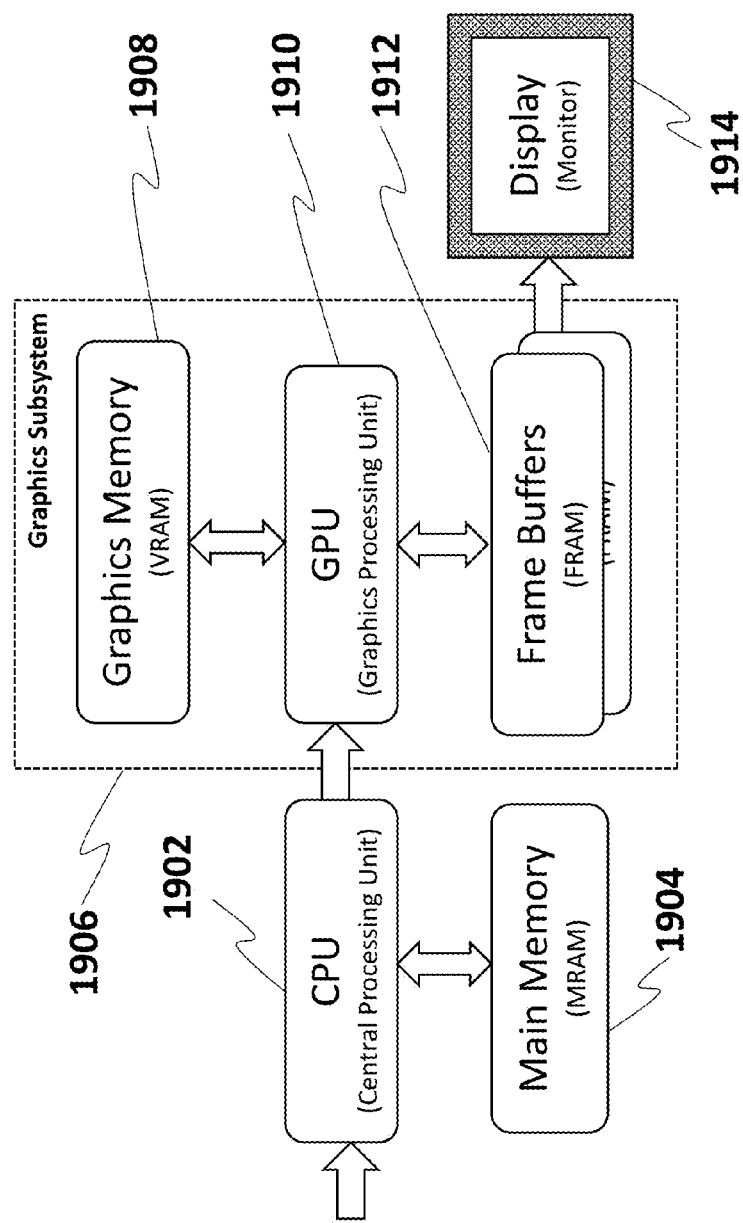
FIG. 18 illustrates general information flow and basic components for displaying content on a modern digital device such as a computer or a smart phone.

The embodiments of the present invention for preventing image or photographic capture may be designed and optimized for modern digital devices, such as but not limited to computers and mobile phones, which are equipped with a central processing unit (CPU) and a graphic processing unit (GPU). FIG. 18 illustrates basic hardware components for displaying content in a modern computing device and the data flow between the components. When a CPU 1902 receives a request to display an image, the image is first loaded into a main memory 1904 and then forwarded to a GPU 1910, which is a part of a graphics subsystem 1906. The graphics subsystem 1906 further includes a graphics memory 1908, which is the working (scratch) memory for the GPU 1910, and frame buffers 1912, which store the color values of each pixel to be displayed on the screen of a display 1914. The display 1914 reads the color values of pixels from the frame buffers 1912 row-by-row from left to right and top to bottom, and outputs each of the values onto the screen as a color, the process of which is known as raster-scan. A complete screen image is known as a frame. The display 1914 refreshes its screen several dozen times per second, also known as refresh rate, typically 60 Hz for LCD monitors and higher for CRT tubes. While the display 1914 reads from the frame buffers 1912 to display the current frame, the GPU 1910 may be updating its content for the next frame (not necessarily in raster-scan manner). This could result in so-called tearing, in which the display 1914 shows parts of the old frame and parts of the new frame. Tearing could be obviated by using so-called double buffering. Instead of using a single frame buffer, modern GPUs use two of them: a front buffer and a back buffer. The display 1914 reads from the front buffer of the frame buffers 1912, while the GPU 1910 can write the next frame to the back buffer of the frame buffers 1912. When the display 1914 finishes reading, it can signal the GPU 1910 to swap the front and back buffer (known as buffer swap or page flip).

Depending on whether the image for displaying from the CPU 1902 needs to be further manipulated, the GPU 1910 either first processes the received image with the graphics memory 1908 and then updates the back buffer of the frame buffers 1912 with the processed result, or just update the back buffer with the received image. The display 1914 then makes the back buffer to become the front buffer and reads the content from the front buffer of the frame buffers 1912 at fixed intervals, typically at a rate of 60 Hz, and paints the display screen accordingly. In order to have image processing capability for high frame rate and low power consumption, modern GPUs are all designed at hardware level (application specific integrated circuit, ASIC) to perform translation (moving), rotation, and scaling transformations efficiently.

With continuing reference to FIG. 18, the present invention is designed and optimized with respect to the modern hardware by forwarding the display image and the blocking mask from the CPU 1902 to the GPU 1910. The GPU 1910 moves (or rotates) the blocking mask by performing a translation (or rotation) transformation efficiently, then combines the moved (or rotated) blocking mask with the display image, and then updates the back buffer of the frame buffers 1912 with the combined composite image. It is important to note that, a full update to the back buffer of the frame buffers 1912 only needs to be done once in the beginning with the blocking mask in the initial position, after which only the portions of the back buffer that experience content change need to be updated, i.e. the portions of the back buffer correspond to the mask opening area at the previous mask position and the current mask position. Because the GPU 1910 has full knowledge of the blocking mask's previous position and current position, which only differ by a translation or a rotation movement, the portions of the back buffer of the frame buffers 1912 that experience content changes are readily identifiable as the opening portions of the blocking mask in the previous and current positions. Therefore, the present invention can mostly avoid the need for updating the full back buffer of the frame buffers 1912, thereby reducing computation time and power consumption. Moreover, when small openings are used for the blocking mask, the portions of the back buffer of the frame buffers 1912 that have content change and need to be updated become small accordingly, which may further reduce the computation time and power consumption. Furthermore, by separately simulating the moving mask from the display content and then displaying the composite images of the mask on top of the display content, the present invention allows the display content to be motion images or video in addition to still images.

In contrast, the prior art method of Belkoura as disclosed in U.S. Patent Application Publication Nos. 20140218402 and 20140218403 divide a full image into a set of subimages and store the set of subimages in the main memory 1904. It should be noted that the graphics memory 1908 is the working (scratch) memory for the GPU 1910 and is used only for storing intermediate image processing, and hence normally cannot be used to store the divided subimages described in the Belkoura method. After the set of the subimages are created and stored in the main memory 1904, the Belkoura method sequentially forwards each subimage to the GPU 1910, which then updates the back frame buffer in full with each received subimage. It is worth noting that, unlike the present invention, the back frame buffer must be updated in full and the "blank" area (as described in Belkoura) of the subimage to be displayed cannot be left untouched, for any un-updated area contains the pixel information for previously displayed subimage and would therefore expose the contents of two subimages at once on a persistent display (non-CRT display such as LCD display), thus defeating the goal of revealing only one subimage at a time in accordance to the Belkoura method. The Belkoura method does not require image processing by the GPU 1910, which is equipped in most modern digital devices, for each subimage forwarded by CPU 1902. However, the Belkoura method does require the CPU 1902 to first divide the original image into a set of subimages, and then makes a full update to one of the frame buffers 1912 for displaying each subimage regardless whether the subimages reside in the main memory 1904 or the graphics memory 1908, thereby leading to longer delay time, lower frame rate, and higher power consumption in comparison to the present invention. Moreover, the approach of "dividing an image into subimages" in the Belkoura method intrinsically limits the method to still images as explicitly stated in the relevant application publications.

In summary, the present invention eliminates the need for dividing original image into a set of subimages, hence eliminates the related storage need, processing delay, and power consumption. While avoiding the need for dividing the original image into a set of subimages and subsequently displaying each subimage in full, the present invention is designed to leverage the efficient image processing power of the GPU 1910 in modern computing devices to drastically reduce the portions of the frame buffers 1912 that need to be updated for displaying each frame on the display 1914. The present invention also eliminates the need for storing the divided subimages and any processing delay or additional power consumption associated with. Therefore, the present invention offers superior performance in term of frame rate and power consumption, in addition to having the capability to handle motion images or video when compared with the prior art method.

The previously described embodiments of the present invention have many advantages, including faster frame rate and lower power consumption. It is important to note, however, that the invention does not require that all the advantageous features and all the advantages need to be incorporated into every embodiment of the present invention.

All the features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

While the present invention has been shown and described with reference to certain preferred embodiments, it is to be understood that those skilled in the art will no doubt devise certain alterations and modifications thereto which nevertheless include the true spirit and scope of the present invention. Thus the scope of the invention should be determined by the appended claims and their legal equivalents, rather than by examples given.

Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

What is claimed is:

1. A non-transitory machine readable storage medium containing program instructions for displaying digital content while preventing image capture, said non-transitory machine readable storage medium configured to:
   generate a mask to superimpose upon a display object, said mask including one or more transparent portions and one or more opaque portions with said one or more opaque portions of said mask blocking said display object therebeneath from viewing; and
   move said mask incrementally to repeatedly expose various portions of said display object at a sufficient speed that renders said one or more opaque portions of said mask substantially invisible to a viewer, wherein said one or more transparent portions of said mask moves to expose at least half of said display object at a rate of at least 5 cycles per second.

2. The non-transitory machine readable storage medium of claim 1, wherein said display object is image, text, video, or any combination thereof.

3. The non-transitory machine readable storage medium of claim 1, wherein said one or more opaque portions of said mask have a black color.

4. The non-transitory machine readable storage medium of claim 1, wherein said one or more transparent portions of said mask have a translational movement, a rotational movement, or any combination thereof to incrementally expose said display object in its entirety.

5. The non-transitory machine readable storage medium of claim 1, wherein at least one edge of said one or more transparent portions of said mask is semi-transparent.

6. The non-transitory machine readable storage medium of claim 1, wherein said one or more transparent portions of said mask have a linear shape extending along a first direction, said linear shape having a dimension along said first direction substantially larger than dimensions along other directions.

7. The non-transitory machine readable storage medium of claim 6, wherein said one or more transparent portions of said mask incrementally moves in a second direction substantially perpendicular to said first direction.

8. The non-transitory machine readable storage medium of claim 1, wherein said one or more transparent portions of said mask form segments of a line that have offsets in a direction substantially perpendicular to said line.

9. The non-transitory machine readable storage medium of claim 1, wherein said one or more transparent portions of said mask have a sector shape bounded by two radii.

10. The non-transitory machine readable storage medium of claim 9, wherein said one or more transparent portions of said mask incrementally moves in a rotation direction substantially perpendicular to said radii.

11. The non-transitory machine readable storage medium of claim 1, wherein said one or more transparent portions of said mask form segments of a sector that have offsets in a rotation direction substantially perpendicular to radii of said sector.

12. The non-transitory machine readable storage medium of claim 1, further comprising generating a video or a sequence of images of said moving masks in successive positions superimposed upon said display object.

13. A computer implemented method for displaying digital content while preventing image capture comprising the steps of:
   generating a mask to superimpose upon a display object on a digital device, said mask including one or more transparent portions that expose said display object;
   displaying a composite image of said mask superimposed upon said display object on said digital device; and
   moving said mask incrementally to repeatedly expose various portions of said display object at a sufficient speed that renders said one or more opaque portions of said mask substantially invisible to a viewer, wherein said one or more transparent portions of said mask moves to expose at least half of said display object at a rate of at least 5 cycles per second.

14. The computer implemented method of claim 13, wherein said digital device is phone, tablet, or computer.

15. The computer implemented method of claim 13, wherein said display object is image, text, video, or any combination thereof.

16. The computer implemented method of claim 13, wherein rate of movement of said mask varies with task load and hardware capability of said digital device.

17. A computer implemented method for displaying digital content while preventing image capture comprising the steps of:
   generating a sequence of composite images of a mask superimposed upon a display object as one or more transparent portions of said mask incrementally move to expose various portions of said display object at a sufficient speed that renders one or more opaque portions of said mask substantially invisible to a viewer, wherein said one or more transparent portions of said mask moves to expose at least half of said display object at a rate of at least 5 cycles per second; and
   displaying each of said sequence of composite images on a digital device after generation thereof.

18. The computer implemented method of claim 17, wherein said sequence of composite images are displayed on said digital device only after all composite images are generated.

19. The computer implemented method of claim 17, wherein said display object is image, text, video, or any combination thereof.

* * * * *